United States Patent
Sargaskayev et al.

(10) Patent No.: US 12,316,479 B2
(45) Date of Patent: May 27, 2025

(54) CALCULATION OF THE METRIC FOR SELECTING THE TYPE OF MODULATION IN SUBCARRIERS FOR AN OFDM SIGNAL

(71) Applicant: VR UNIBLOCK INC., San Francisco, CA (US)

(72) Inventors: Abylay Sargaskayev, Almaty (KZ); Konstantin Tiutin, Almaty (KZ); Denis Kazimirov, Almaty (KZ); Andrey Vasilchenko, Almaty (KZ); Ilya Rubanov, Almaty (KZ)

(73) Assignee: VR UNIBLOCK INC., San Francisco, CA (US)

( * ) Notice: Subject to any disclaimer, the term of this patent is extended or adjusted under 35 U.S.C. 154(b) by 68 days.

(21) Appl. No.: 18/189,077

(22) Filed: Mar. 23, 2023

(65) Prior Publication Data
US 2024/0323057 A1 Sep. 26, 2024

(51) Int. Cl.
*H04L 25/02* (2006.01)
*H04L 27/26* (2006.01)

(52) U.S. Cl.
CPC ...... *H04L 25/0242* (2013.01); *H04L 25/0224* (2013.01); *H04L 27/26025* (2021.01)

(58) Field of Classification Search
CPC ............. H04L 25/0242; H04L 25/0224; H04L 27/26025
See application file for complete search history.

(56) References Cited

U.S. PATENT DOCUMENTS

| | | | |
|---|---|---|---|
| 2003/0039317 A1 | 2/2003 | Taylor et al. | |
| 2007/0025392 A1* | 2/2007 | Moorti | H04L 27/0012 370/465 |
| 2007/0070877 A1 | 3/2007 | Sun et al. | |
| 2007/0071122 A1* | 3/2007 | Ling | H04L 27/0012 375/260 |
| 2007/0243837 A1* | 10/2007 | Krishnamoorthi | H04L 1/206 455/67.11 |
| 2010/0135426 A1* | 6/2010 | Maltsev | H04L 5/006 375/260 |
| 2017/0257238 A1 | 9/2017 | Qian et al. | |
| 2022/0271792 A1* | 8/2022 | Kremer | H04L 5/0053 |

OTHER PUBLICATIONS

International Search Report and Written Opinion ssued in corresponding International Application No. PCT/US 24/13024, dated May 8, 2024, U.S. Patent and Trademark Office, Alexandria, Virginia, pp. 1-16.

* cited by examiner

*Primary Examiner* — Jean B Corrielus
(74) *Attorney, Agent, or Firm* — Studebaker Brackett PLLC

(57) ABSTRACT

A method includes obtaining complex pilot data in a frame from a sequence signal, determining an estimate of a Doppler shift from a cyclic prefix and a cyclic postfix of the frame, performing time-domain processing of an amplitude and phase of the complex pilot data separately for each subcarrier, determining a time average of the amplitude of the complex pilot data, correcting the phase of the complex pilot data by the estimate of the Doppler shift thereby generating the corrected phase, and filtering the corrected phase by a first filter. The method further includes calculating a metric for selecting a modulation type in subcarriers at a receiver with pre-selected or dynamically adjusted boundaries.

16 Claims, 12 Drawing Sheets

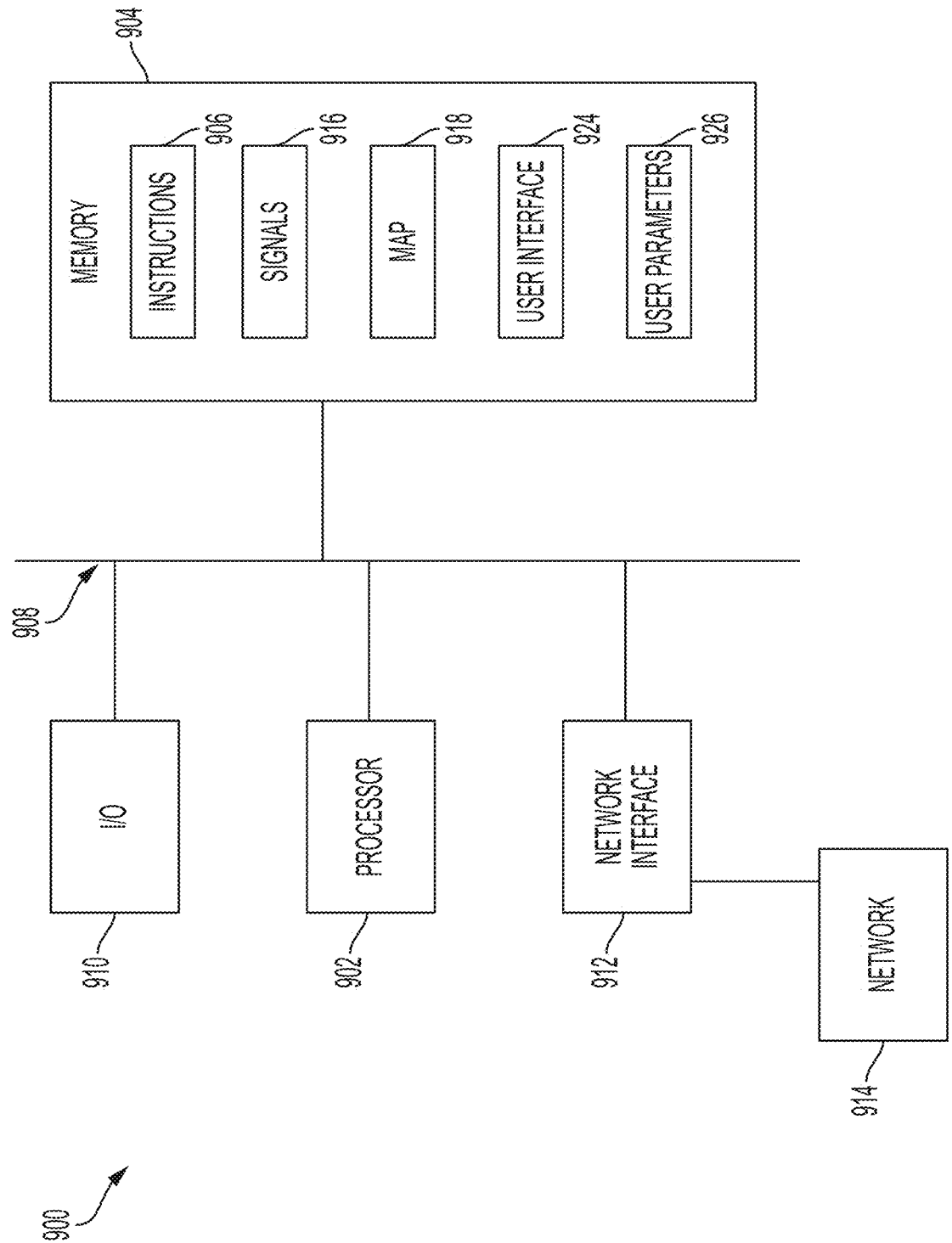

CALCULATION OF THE METRIC FOR SELECTING THE TYPE OF MODULATION IN SUBCARRIERS FOR AN OFDM SIGNAL

BACKGROUND

When a radio frequency (RF) signal with multiple subcarriers propagates from a transmitter to a receiver through a transmission space, the RF signal is distorted due to noise resulting in data loss. Different approaches are utilized to improve signal distortion and to improve data loss.

BRIEF DESCRIPTION OF THE DRAWINGS

Some embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

FIG. 9 is a block diagram of a system, in accordance with some embodiments.

DETAILED DESCRIPTION

Figure 1:
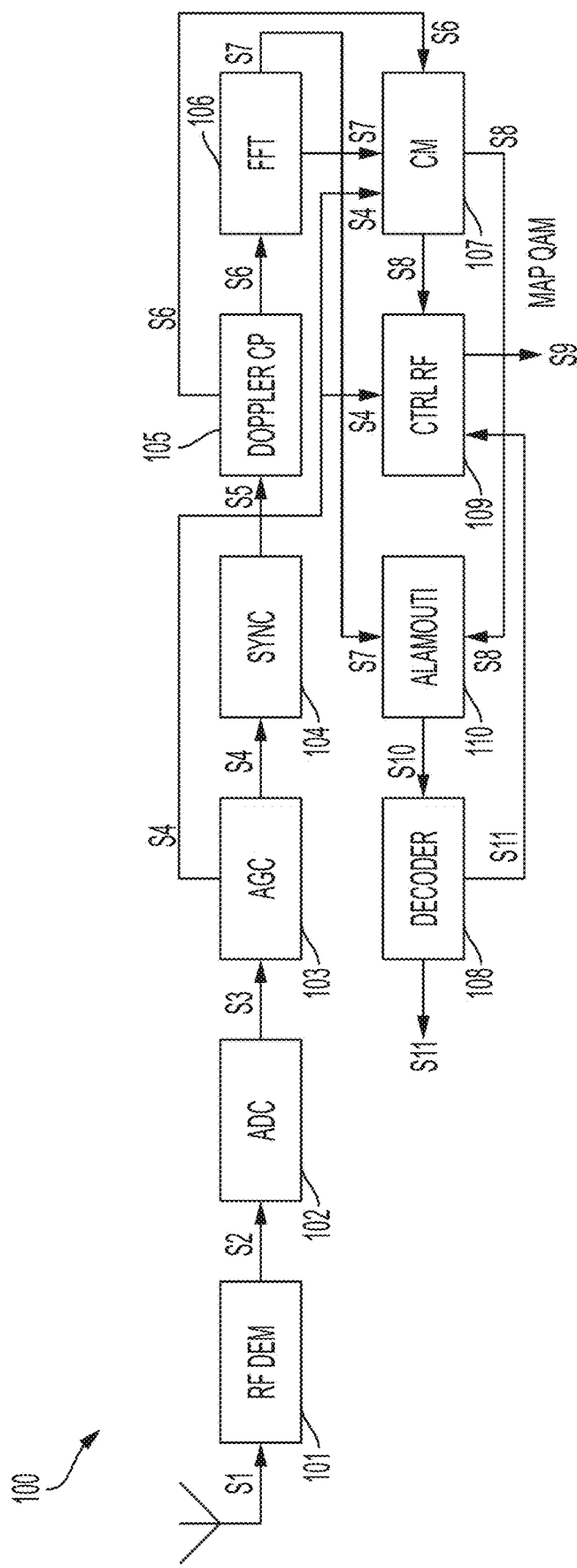
FIG. 1 is a block diagram of a receiver, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

When RF wideband signals with multiple subcarriers propagate from a transmitter to a receiver, the signal is distorted due to noise, and data loss occurs. In some embodiments, to reduce data loss, noise is detected in subcarriers, and if their level exceeds the threshold value, then the modulation type in this subcarrier is changed to a more noise-resistant one. At the same time, if the level of noise is sufficiently low in a transmission channel in a certain subcarrier or a group of subcarriers, then using higher capacity modulation more data can be successfully transmitted.

In order to detect noise in a transmission channel, one more embodiments disclose a metric that calculates the SNR (signal to noise ratio) in each subcarrier or a group of subcarriers of a wideband signal. In some embodiments, the threshold values of the metric for switching the modulation type is set to static values that are pre-selected so that the signal is decoded below the specified error level or are dynamically adjusted from data recovery statistics in the error-correcting decoder (Reed-Solomon, LDPC (Low-density parity-check code)) on the receiving side.

One or more embodiments of the present disclosure disclose an adaptive system for calculating the metric for selecting the type of modulation and operating the system. In some embodiments, the boundaries for selecting the type of modulation are set to static values. In some embodiments, the metric thresholds are dynamically adjusted from data recovery statistics in the noise-resistant decoder. One or more embodiments of the methods and systems disclosed herein are implemented in hardware, software, firmware, and combinations thereof, including discrete and integrated circuit logic, application specific integrated circuit (ASIC) logic, and field programmable gate array (FPGA).

FIG. 1 is a block diagram of a receiver 100, in accordance with some embodiments.

In some embodiments, the receiver 100 is an Orthogonal Frequency Division Multiplexing (OFDM) receiver. In some embodiments, the receiver 100 is configured to implement a method for calculating a metric for choosing a modulation type. In some embodiments, the metric is a signal to noise ratio (SNR) of a received signal (e.g., RF signal S1).

The receiver 100 includes an RF demodulator 101 coupled to an analog-to-digital converter (ADC) 102.

The RF demodulator 101 is configured to receive a transmitted radio frequency (RF) signal S1. The RF demodulator 101 is configured to demodulate the transmitted RF signal S1. The RF demodulator 101 is configured to generate a de-modulated analog signal S2 in response to the transmitted RF signal S1.

The ADC 102 is configured to receive the de-modulated analog signal S2. The ADC 102 is configured to sample the de-modulated analog signal S2. The ADC 102 is configured to generate a series of digital samples S3 in response to the de-modulated analog signal S2.

The receiver 100 further includes an automatic gain control (AGC) circuit 103 coupled to an output of the ADC 102. An output of the AGC circuit 103 is coupled to an input of a SYNC circuit 104, an input of a channel measurer (CM) 107 and an input of a Control RF 109.

The AGC circuit 103 is configured to receive the series of digital samples S3. The AGC circuit 103 is configured to adjust an amplitude of the series of digital samples S3. The AGC circuit 103 is configured to generate a signal S4 in response to the series of digital samples S3.

The receiver 100 further includes the SYNC circuit 104 that is coupled to an output of the AGC circuit 103. An output of the SYNC circuit 104 is coupled to an input of a Doppler shift circuit 105.

The SYNC circuit 104 is configured to receive the signal S4. The SYNC circuit 104 is configured to generate a signal S5 in response to the signal S4. In some embodiments, the SYNC circuit 104 is configured to determine the symbol boundaries of the OFDM signal. In some embodiments, the signal S5 corresponds to the symbol boundaries of the OFDM signal.

The receiver 100 further includes a Doppler shift circuit 105 coupled to an output of the SYNC circuit 104. An output of the Doppler shift circuit 105 is coupled to an input of a Fast Fourier Transform (FFT) 106 and an input of the CM 107.

The Doppler shift circuit 105 is configured to receive the signal S5. The Doppler shift circuit 105 is configured to generate a signal S6 in response to the signal S5. In some embodiments, the Doppler shift circuit 105 is configured to determine an estimate of the phase shift due to the Doppler shift over the cyclic prefix and postfix. In some embodiments, the signal S6 corresponds to the estimate of the phase shift due to the Doppler shift over the cyclic prefix and postfix.

The receiver 100 further includes a FFT 106 coupled to an output of the Doppler shift circuit 105. An output of the FFT 106 is coupled to an input of an Alamouti circuit 110 and an input of the CM 107.

The FFT 106 is configured to receive the signal S6. The FFT 106 is configured to generate a signal S7 in response to the signal S6. In some embodiments, the FFT 106 is configured to convert the resulting digital signal to the frequency domain. In some embodiments, the signal S7 corresponds to the frequency domain of the resulting digital signal.

The receiver 100 further includes a CM 107 coupled to an output of the FFT 106. An output of the CM 107 is coupled to an input of an Alamouti circuit 110 and an input of a Control RF 109.

The CM 107 is configured to receive the signal S7, signal S4 and signal S6. The CM 107 is configured to generate a signal S8 in response to the signal S7, signal S4 and signal S6. In some embodiments, the CM 107 is configured to determine the complex frequency response (CFR) of each transmission channel by accumulating pilot data samples (e.g., signal S7) and their subsequent interpolation. In some embodiments, the signal S8 corresponds to the CFR of each transmission channel.

The receiver 100 further includes a Control RF 109 coupled to an output of the CM 107, an output of the AGC circuit 103, and an output of a decoder 108. An output of the Control RF 109 is configured to output a signal S9.

The Control RF 109 is configured to receive the signal S4, signal S8 and signal S11. The Control RF 109 is configured to generate a signal S9 in response to the signal S4, signal S8 and signal S11. In some embodiments, the Control RF 109 is configured to determine whether to switch the type of modulation in each subcarrier or a group of subcarriers of the OFDM signal, and to generate an updated modulation map based on a metric. In some embodiments, the updated modulation map is transmitted to a transmitter 201 (FIG. 2) by an Uplink 204. In some embodiments, the signal S9 corresponds to the updated modulation map.

In some embodiments, Control RF 109 is configured to determine the metric in response to at least the signal S8. For example, in some embodiments, Control RF 109 is configured to determine the metric in response to an amplitude frequency response of the complex frequency response (e.g., determined by CM 107) of each transmission channel.

In some embodiments, Control RF 109 is configured to receive the signal S11. For example, in some embodiments, signal S11 corresponds to data recovery statistics that are generated by decoder 108. In some embodiments, Control RF 109 is configured to determine boundaries or thresholds or to adjust boundaries or thresholds of each type of modulation for the metric based on the data recovery statistics received from the decoder 108.

In some embodiments, Control RF 109 is configured to obtain the metric by directly calculating the signal-to-noise (SNR) ratio for the amplitude-frequency response (AFR) in each subcarrier or a group of subcarriers of the OFDM signal.

In some embodiments, the type of modulation in each subcarrier or a group of subcarriers of the OFDM signal is determined by Control RF 109 by comparing the value of the metric and the boundaries or thresholds of each type of modulation. In some embodiments, boundaries or thresholds are pre-selected. In some embodiments, boundaries or thresholds are dynamically adjusted.

The receiver 100 further includes an Alamouti circuit 110 coupled to an output of the CM 107 and an output of the FFT 106. An output of the Alamouti circuit 110 is coupled to an input of a decoder 108.

The Alamouti circuit 110 is configured to receive the signal S7 and signal S8. The Alamouti circuit 110 is configured to generate a signal S10 in response to the signal S7 and signal S8. In some embodiments, the Alamouti circuit 110 is configured to use a block space-time coding method according to an Alamouti scheme. In some embodiments, each receiver receives a signal from each transmitter antenna. In some embodiments, the signal S10 corresponds to a signal of each transmission channel by using the block space-time coding method according to the Alamouti scheme.

The receiver 100 further includes a decoder 108 coupled to an output of the Alamouti circuit 110. An output of the decoder 108 is coupled to an input of Control RF 109.

The decoder 108 is configured to receive the signal S10. The decoder 108 is configured to generate a signal S11 in response to the signal S10. In some embodiments, the decoder 108 is configured to decode the signal S10 thereby generating signal S11. In some embodiments, the decoder 108 is configured to collect statistics about data recovery. In some embodiments, the signal S11 corresponds to statistics about data recovery that are used by Control RF 109.

Other functions, configurations or number of elements in receiver 100 are within the scope of the present disclosure.

Figure 2:
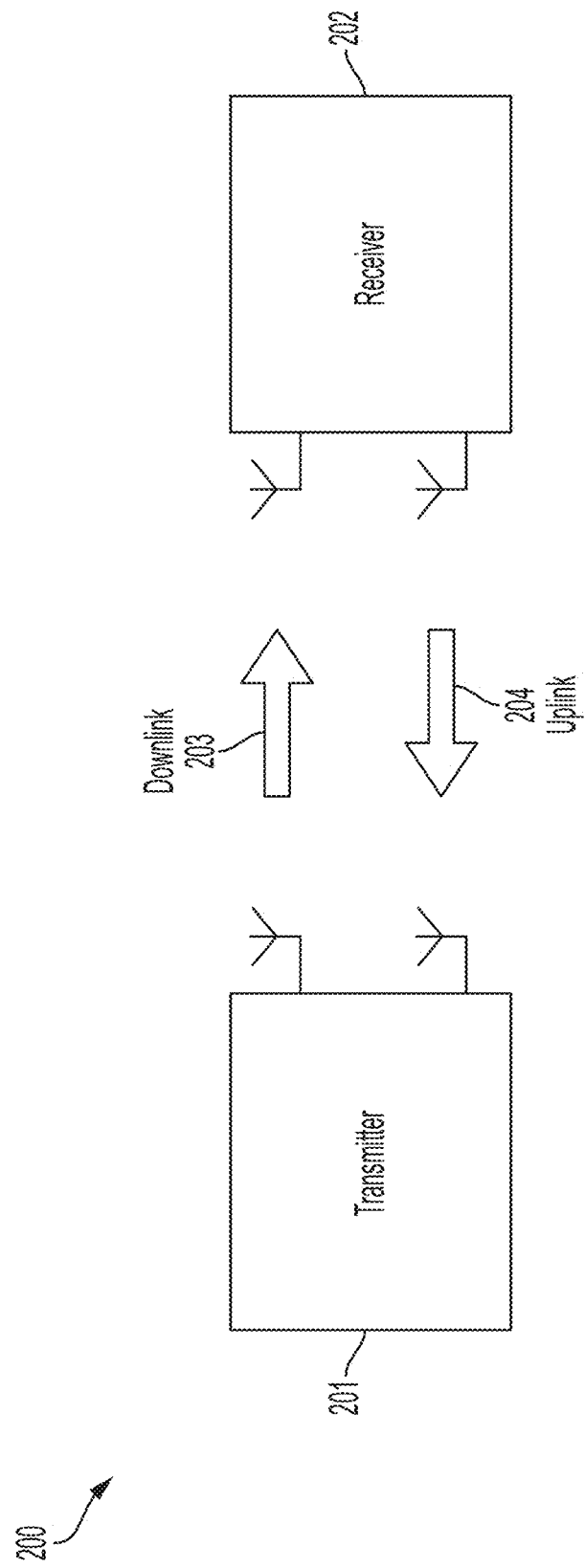
FIG. 2 is a block diagram of a communication system, in accordance with some embodiments.

FIG. 2 is a block diagram of a communication system 200 (hereinafter referred to as "system 200"), in accordance with some embodiments.

System 200 includes a transmitter 201 and a receiver 202. In some embodiments, receiver 100 is an embodiment of at least one of transmitter 201 or receiver 202, and similar detailed description is omitted.

Transmitter 201 is configured to transmit a first set of data (not labeled) over a downlink channel 203 (e.g., forward channel). Transmitter 201 is configured to receive a second set of data (not labeled) over an uplink channel 204 (e.g., reverse channel).

Receiver 202 is configured to receive the first set of data (not labeled) over the downlink channel 203 (e.g., forward channel). Receiver 202 is configured to transmit the second set of data (not labeled) over the uplink channel 204 (e.g., reverse channel).

In some embodiments, at least one of the transmitter 201 or the receiver 202 is a type of mobile terminal, fixed terminal, or portable terminal including a desktop computer, laptop computer, notebook computer, netbook computer, tablet computer, wearable circuitry, mobile handset, server, gaming console, virtual reality head mounted display or combinations thereof. In some embodiments, at least one of the transmitter 201 or the receiver 202 is part of a device that includes a display by which a user interface is displayed.

In some embodiments, at least one of the downlink channel 203 or the uplink channel 204 is based on technologies, such as Orthogonal Frequency Division Multiplexing (OFDM). Other technologies are within the scope of the present disclosure. In some embodiments, at least one of the downlink channel 203 or the uplink channel 204 is based on technologies, such as code division multiple access (CDMA), wideband CDMA (WCDMA), time division multiple access (TDMA), frequency division multiple access (FDMA), single carrier frequency division multiple access (SC-FDMA), Orthogonal Frequency Division Multiplexing (OFDM), Orthogonal Frequency Division Multiple Access (OFDMA), time division duplexing (TDD), frequency division duplexing (FDD), Bluetooth, Infrared (IR), or the like, or other protocols that may be used in a wireless communications network or a wired data communications network.

Accordingly, the exemplary illustrations provided herein are not intended to limit the embodiments of the disclosure and are merely to aid in the description of aspects of the embodiments of the disclosure.

Other functions, configurations or number of elements in system 200 are within the scope of the present disclosure.

Figure 3A:
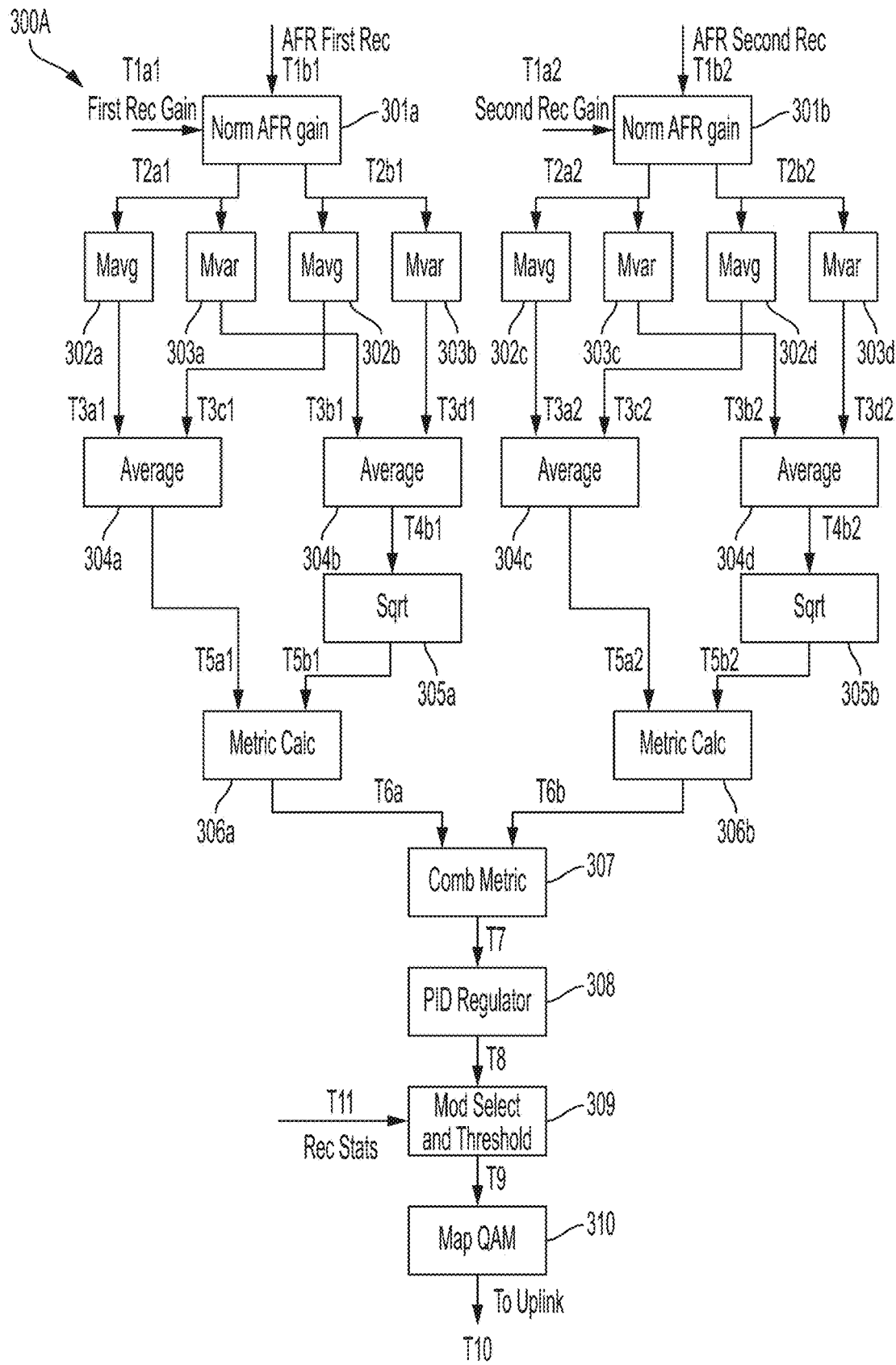
FIG. 3A is a block diagram of a system, in accordance with some embodiments.

FIG. 3A is a block diagram of a system 300A, in accordance with some embodiments.

In some embodiments, system 300A is an embodiment of at least Control RF 109 of FIG. 1, and similar detailed description is omitted.

In some embodiments, signals T1$a$1 and T1$a$2 are embodiments of signal S4, signals T1$b$1 and T1$b$2 are embodiments of signal S8, and signal T10 is an embodiment of signal S9, and similar detailed description is omitted.

In some embodiments, system 300A is a block diagram of Control RF 109 of the modulation type selection in the subcarriers of the OFDM signal for two receivers (e.g., receiver 202).

System 300A includes a portion 390 and a portion 392. In some embodiments, portion 390 corresponds to a first receiver, and portion 392 corresponds to a second receiver. Other numbers of receivers and portions are within the scope of the present disclosure.

Each of portion 390 and 392 have different amplification from each other, which is calculated by corresponding AGC circuit 103, therefore 2 branches within system 300A are utilized. Each branch is associated with a corresponding receiver. Other number of branches or portions are within the scope of the present disclosure.

Each of portion 390 or 392 are configured to receive a corresponding amplitude frequency response from a corresponding CM 107.

Portion 390 includes a normalized AFR gain circuit 301$a$, a moving average circuit 302$a$, a moving average circuit 302$b$, a moving variance circuit 303$a$, a moving variance circuit 303$b$, an average circuit 304$a$, an average circuit 304$b$, a square root circuit 305$a$ and a metric calculation circuit 306$a$.

Portion 392 includes a normalized AFR gain circuit 301$b$, a moving average circuit 302$c$, a moving average circuit 302$d$, a moving variance circuit 303$c$, a moving variance circuit 303$d$, an average circuit 304$c$, an average circuit 304$d$, a square root circuit 305$b$ and a metric calculation circuit 306$b$.

In some embodiments, at least one of normalized AFR gain circuit 301$b$, moving average circuit 302$c$, moving average circuit 302$d$, moving variance circuit 303$c$, moving variance circuit 303$d$, average circuit 304$c$, average circuit 304$d$, square root circuit 305$b$ or metric calculation circuit 306$b$ is similar to corresponding normalized AFR gain circuit 301$a$, moving average circuit 302$a$, moving average circuit 302$b$, moving variance circuit 303$a$, moving variance circuit 303$b$, average circuit 304$a$, average circuit 304$b$, square root circuit 305$a$ and metric calculation circuit 306$a$, and similar detailed description is omitted.

System 300A further includes a combined metric circuit 307, a proportional integral derivative (PID) circuit 308, a decision circuit 309, and a map circuit 310.

The normalized AFR gain circuit 301$a$ is configured to receive signal T1$a$1 and signal T1$b$1. In some embodiments, signal T1$a$1 is a gain level from AGC circuit 103 of the first receiver. In some embodiments, signal T1$b$1 is an amplitude frequency response from CM 107 of the first receiver.

The normalized AFR gain circuit 301$a$ is configured to normalize the signal T1$b$1 (e.g., amplitude frequency response) of portion 390 by signal T1$a$1 (e.g., gain level) thereby generating at least one of signal T2$a$1 or T2$b$1.

The normalized AFR gain circuit 301$a$ is configured to output signals T2$a$1 and T2$b$1. In some embodiments, signals T2$a$1 and T2$b$1 are different from each other.

The normalized AFR gain circuit 301$a$ is coupled to moving average circuit 302$a$, moving average circuit 302$b$, moving variance circuit 303$a$, moving variance circuit 303$b$.

Moving average circuit 302$a$ is configured to generate a signal T3$a$1 in response to signal T2$a$1. Signal T3$a$1 is a moving average value of the normalized amplitude frequency response (e.g., signal T2$a$1). Moving average circuit 302$a$ is configured to determine the moving average value of the normalized amplitude frequency response.

Moving average circuit 302$a$ is coupled to average circuit 304$a$.

Moving average circuit 302$b$ is configured to generate a signal T3$c$1 in response to signal T2$b$1. Signal T3$c$1 is a moving average value of the normalized amplitude frequency response (e.g., signal T2$b$1). Moving average circuit 302$b$ is configured to determine the moving average value of the normalized amplitude frequency response.

Moving average circuit 302$b$ is coupled to average circuit 304$a$.

Moving variance circuit 303a is configured to generate a signal T3b1 in response to signal T2a1. Signal T3b1 is a moving variance value of the normalized amplitude frequency response (e.g., signal T2a1). Moving variance circuit 303a is configured to determine the moving variance value of the normalized amplitude frequency response.

Moving variance circuit 303a is coupled to average circuit 304b.

Moving variance circuit 303b is configured to generate a signal T3d1 in response to signal T2b1. Signal T3dl is a moving variance value of the normalized amplitude frequency response (e.g., signal T2b1). Moving variance circuit 303b is configured to determine the moving variance value of the normalized amplitude frequency response.

Moving variance circuit 303b is coupled to average circuit 304b.

In some embodiments, an exponential moving average (EMA) is used by at least one of moving average circuit 302a, moving average circuit 302b, moving average circuit 302c, moving average circuit 302d instead of a moving average to save resources.

The mean $m_0$ and the variance $s_0/n$ are calculated with n samples $x_0, \ldots, x_{n-1}$, the updated $m_1$ and $s_1/n$ with samples $x_1, \ldots, x_n$. The recurrent forms of calculating the variance is determined according to formula 1:

$$S_1 = S_0 + (x_n - x_0)\left(\frac{n-1}{n}x_n + \frac{n+1}{n}x_0 - 2m_0\right) \quad (1)$$

In some embodiments, recurrent forms of calculating the variance from equation 1 are used without data accumulation by at least one of moving variance circuit 303a, moving variance circuit 303b, moving variance circuit 303c, moving variance circuit 303d.

Average circuit 304a is configured to generate a signal T5a1 in response to signal T3a1 and signal T3cl. Signal T5a1 is an average of the normalized amplitude frequency response of the channel in portion 390. Average circuit 304a is configured to determine the average of the normalized amplitude frequency response of the channel in portion 390.

Average circuit 304a is coupled to metric calculation circuit 306a.

Average circuit 304b is configured to generate a signal T4b1 in response to signal T3b1 and signal T3d1. Signal T4b1 is an average of the dispersion (e.g., variance) of the normalized amplitude frequency response of the channel in portion 390. Average circuit 304b is configured to determine the dispersion of the normalized amplitude frequency response of the channel in portion 390.

Average circuit 304b is coupled to square root circuit 305a.

Square root circuit 305a is configured to generate a signal T5b1 in response to signal T4b1. Signal T5b1 is the square root of signal T4b1. Signal T5b1 is the standard deviation of the normalized amplitude frequency response of the channel in portion 390. Signal T5b1 is the square root of the average of the dispersion (e.g., variance) of the normalized amplitude frequency response of the channel in portion 390. Square root circuit 305a is configured to determine the standard deviation of the normalized amplitude frequency response of the channel in portion 390.

Square root circuit 305a is coupled to metric calculation circuit 306a.

Metric calculation circuit 306a is configured to generate a signal T6a in response to signal T5a1 and signal T5b1. In some embodiments, signal T6a is a metric on each subcarrier or a group of subcarriers in portion 390.

In some embodiments, signal T6a is a metric on each subcarrier or a group of subcarriers for portion 390, and is equal to the ratio of the amplitude frequency response to the standard deviation of the amplitude frequency response. In some embodiments, signal T6a is equal to the ratio of signal T5a1 to signal T5b1.

Metric calculation circuit 306a is configured to determine the metric on each subcarrier or a group of subcarriers for portion 390, and is equal to the ratio of the amplitude frequency response to the standard deviation of the amplitude frequency response.

As noted above, portion 392 is similar to portion 390, each element in portion 392 is similar to a corresponding element in portion 390, and each signal in portion 392 is similar to a corresponding signal in portion 390, and similar detailed description is omitted.

Metric calculation circuit 306b is configured to generate a signal T6b in response to signal T5a2 and signal T5b2. In some embodiments, signal T6b is a metric on each subcarrier or a group of subcarriers in portion 392.

In some embodiments, signal T6b is a metric on each subcarrier or a group of subcarriers for portion 392, and is equal to the ratio of the amplitude frequency response to the standard deviation of the amplitude frequency response. In some embodiments, signal T6b is equal to the ratio of signal T5a2 to signal T5b2.

Metric calculation circuit 306b is configured to determine the metric on each subcarrier or a group of subcarriers for portion 392, and is equal to the ratio of the amplitude frequency response to the standard deviation of the amplitude frequency response.

Combined metric circuit 307 is coupled to metric calculation circuit 306a and metric calculation circuit 306b.

Combined metric circuit 307 is configured to generate a signal T7 in response to signal T6a and signal T6b. In some embodiments, signal T7 is a combined metric for all receivers. In some embodiments, signal T7 is a combined metric on each subcarrier or a group of subcarriers in portion 390 and portion 392. In some embodiments, combined metric circuit 307 is configured to determine the combined metric for all receivers. In some embodiments, combined metric circuit 307 is configured to determine combined metric on each subcarrier or a group of subcarriers for portion 390 and portion 392.

In some embodiments, if each transmitter (e.g., transmitter 201) includes its own modulation type map, then the metric aggregation process performed by combined metric circuit 307 does not occur.

Combined metric circuit 307 is further coupled to PID circuit 308.

PID circuit 308 is configured to generate a signal T8 in response to signal T7. In some embodiments, signal T8 is a corrected version of signal T7. In some embodiments, PID circuit 308 is configured to process signal T7 to prevent unnecessary, frequent modulation type switches due to the noise-like nature of the metric parameter. In some embodiments, PID circuit 308 quickly switches modulations to more noise-resistant ones in the event of radio interference. In some embodiments, PID circuit 308 slowly switches noise-resistant modulations to higher capacity modulations in the absence of noise for a significant amount of time.

PID circuit 308 is coupled to decision circuit 309.

Decision circuit 309 is configured to generate a signal T9 in response to signal T8 and signal T11. Signal T11 is embodiments of signal S11. In some embodiments, signal T9 corresponds to a decision whether to change the modulation type in each subcarrier or a group of subcarriers based on at least signal T8 and signal T11. In some embodiments, signal T11 corresponds to statistics on data recovery used in an error-correcting decoder such as error-correcting decoder 108 (Reed-Solomon, LDPC) that is used for dynamically adjusting one or more threshold values (e.g., threshold values 402) for each modulation type.

In some embodiments, signal T9 corresponds to a decision whether to change the modulation type in each subcarrier or a group of subcarriers based on at least signal T8, T6a, T6b, T7 or T11.

In some embodiments, decision circuit 309 is configured to determine whether to change the modulation type in each subcarrier or a group of subcarriers based on a metric 401 (FIG. 4) and the corresponding threshold values 402 (FIG. 4) for each modulation type, for one subcarrier or a group. In some embodiments, the threshold values include static values or dynamically adjusted values.

Decision circuit 309 is coupled to map circuit 310.

Map circuit 310 is configured to generate a signal T10 in response to signal T9. In some embodiments, signal T10 corresponds to a modulation map that is generated in each subcarrier or a group of subcarriers for the current modulation type (e.g., switched modulation type) from signal T9. In some embodiments, signal T10 corresponds to a new or updated modulation map that is generated in each subcarrier or a group of subcarriers for the current modulation type (e.g., switched modulation type) from signal T9. In some embodiments, signal T10 is an embodiment of signal S9, and similar detailed description is omitted.

In some embodiments, signal T10 is transmitted to transmitter 201 by Uplink 204 by system 300A.

Other functions, configurations or number of elements in system 300A are within the scope of the present disclosure.

Figure 3B:
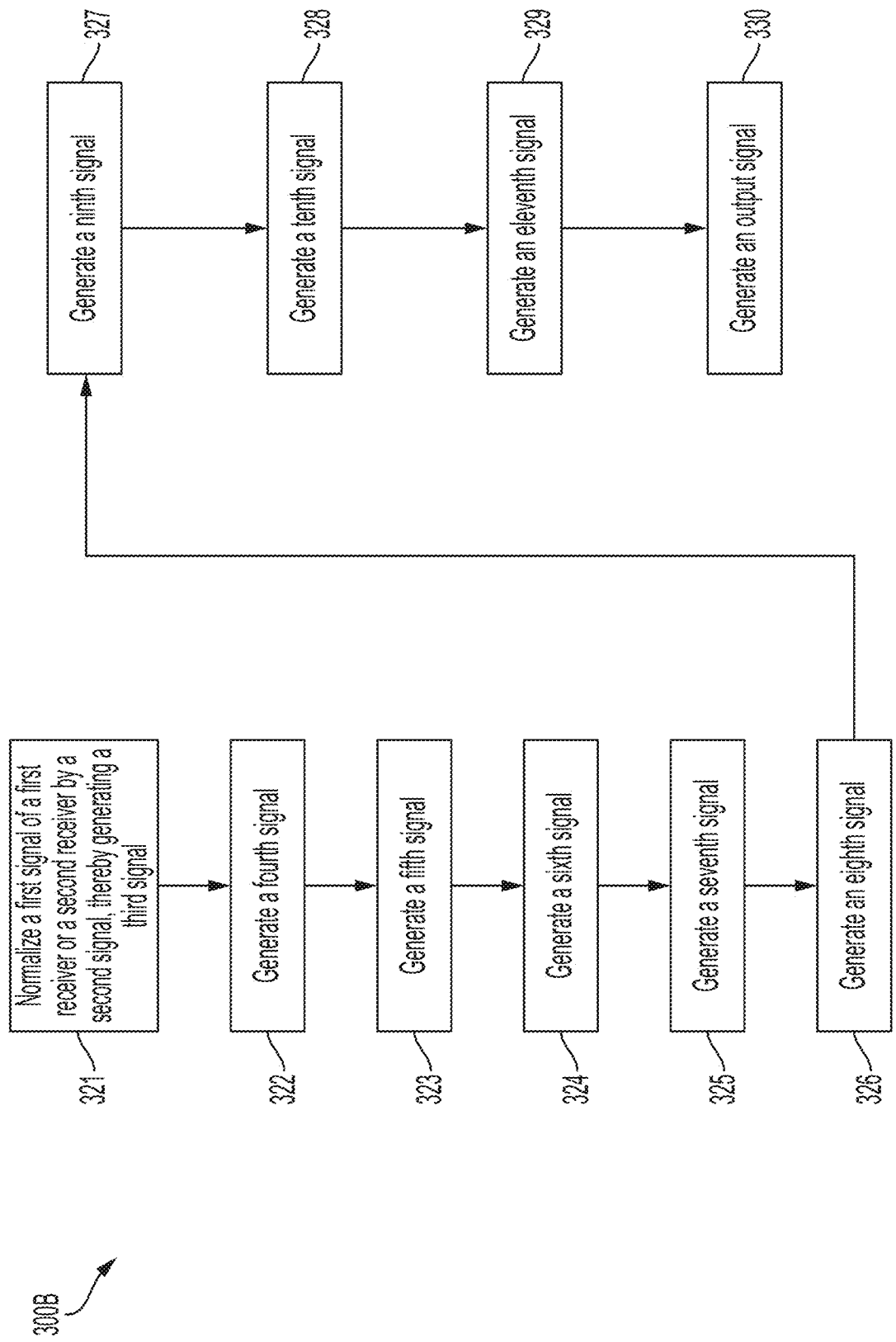
FIG. 3B is a flowchart of a method of operating the system of FIG. 3A, in accordance with some embodiments.

FIG. 3B is a flowchart of a method 300B, in accordance with some embodiments. In some embodiments, method 300B is a method of operating system 300A, and similar detailed description is omitted.

In some embodiments, at least portions of method 300B are performed by system 300A.

In some embodiments, FIG. 3B is a flowchart of a method 300B of operating system 100 of FIG. 1 or system 300A of FIG. 3A, and similar detailed description is therefore omitted. It is understood that additional operations may be performed before, during, and/or after the method 300B depicted in FIG. 3B, and that some other operations may only be briefly described herein. In some embodiments, other order of operations of method 300B is within the scope of the present disclosure. In some embodiments, one or more operations of method 300B are not performed.

Method 300B includes exemplary operations, but the operations are not necessarily performed in the order shown. Operations may be added, replaced, changed order, and/or eliminated as appropriate, in accordance with the spirit and scope of disclosed embodiments. It is understood that method 300B utilizes features of one or more of system 100 or system 300A.

In operation 321, the normalized AFR gain circuit 301a or 301b is configured to normalize a first signal (T1b1 or T1b2) (e.g., amplitude frequency response) of portion 390 or 392 by a second signal (T1a1 or T1a2), thereby generating at least one of a third signal (T2a1, T2b1, T2a2, T2b2).

In operation 322, the moving average circuit 302a or 302b is configured to generate a fourth signal (T3a1, T3c1) in response to the third signal.

In operation 323, the moving variance circuit 303a or 303b is configured to generate a fifth signal (T3b1, T3d1) in response to the third signal.

In operation 324, the average circuit 304a or 304b is configured to generate a sixth signal (T5a1, T4b1) in response to the fourth signal or the fifth signal.

In operation 325, the square root circuit 305a is configured to generate a seventh signal (T5b1) in response to the fifth signal.

In operation 326, the metric calculation circuit 306a or 306b is configured to generate an eighth signal (T6a, T6b) in response to the sixth signal and the seventh signal.

In operation 327, the combined metric circuit 307 is configured to generate a ninth signal (T7) in response to the eighth signal.

In operation 328, PID circuit 308 is configured to generate a tenth signal (T8) in response to the ninth signal.

In operation 329, decision circuit 309 is configured to generate an eleventh signal (T9) in response to the tenth signal.

Figure 4:
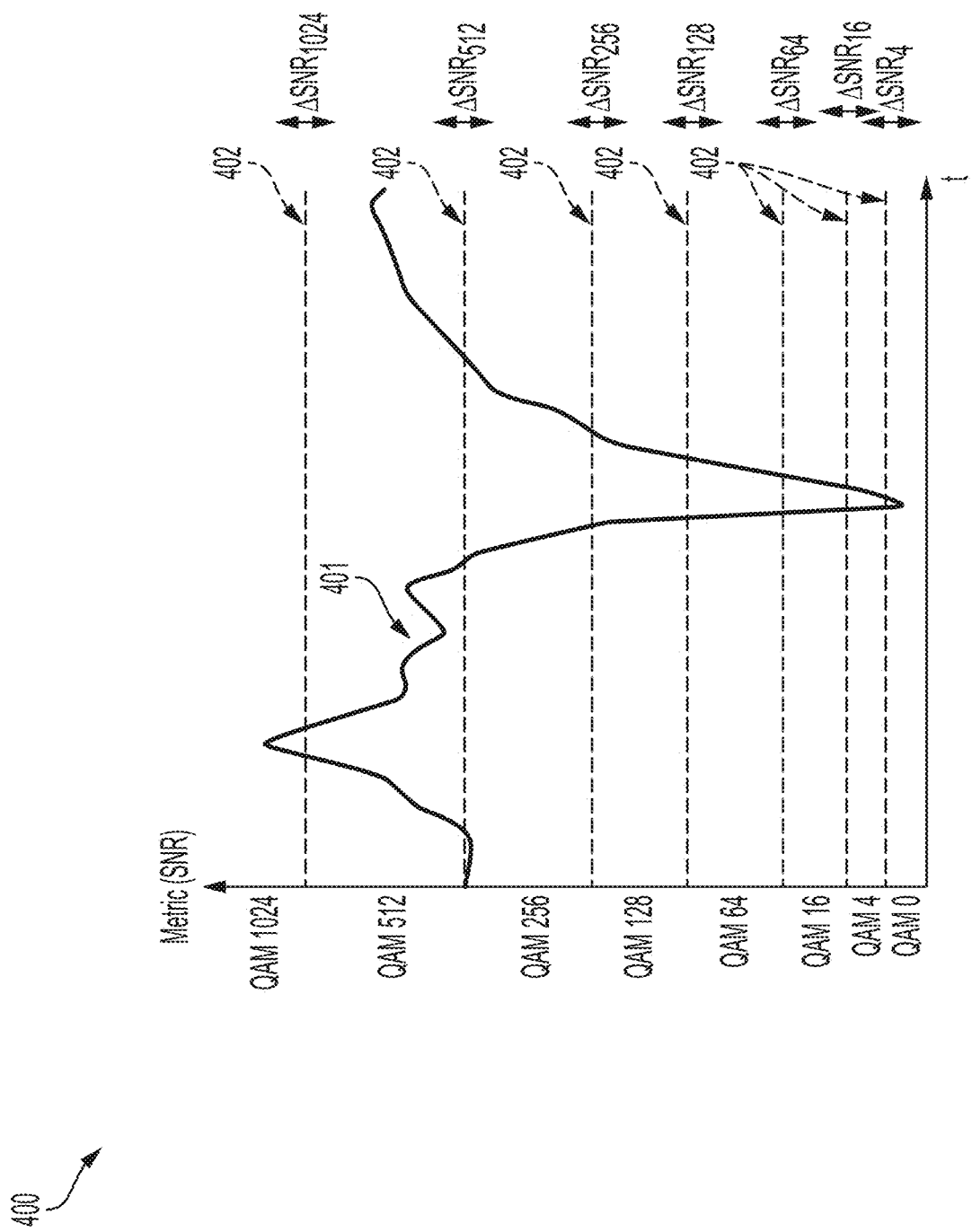
FIG. 4 is a graph for selecting the type of modulation using metrics and thresholds, in accordance with some embodiments.
Figure 5:
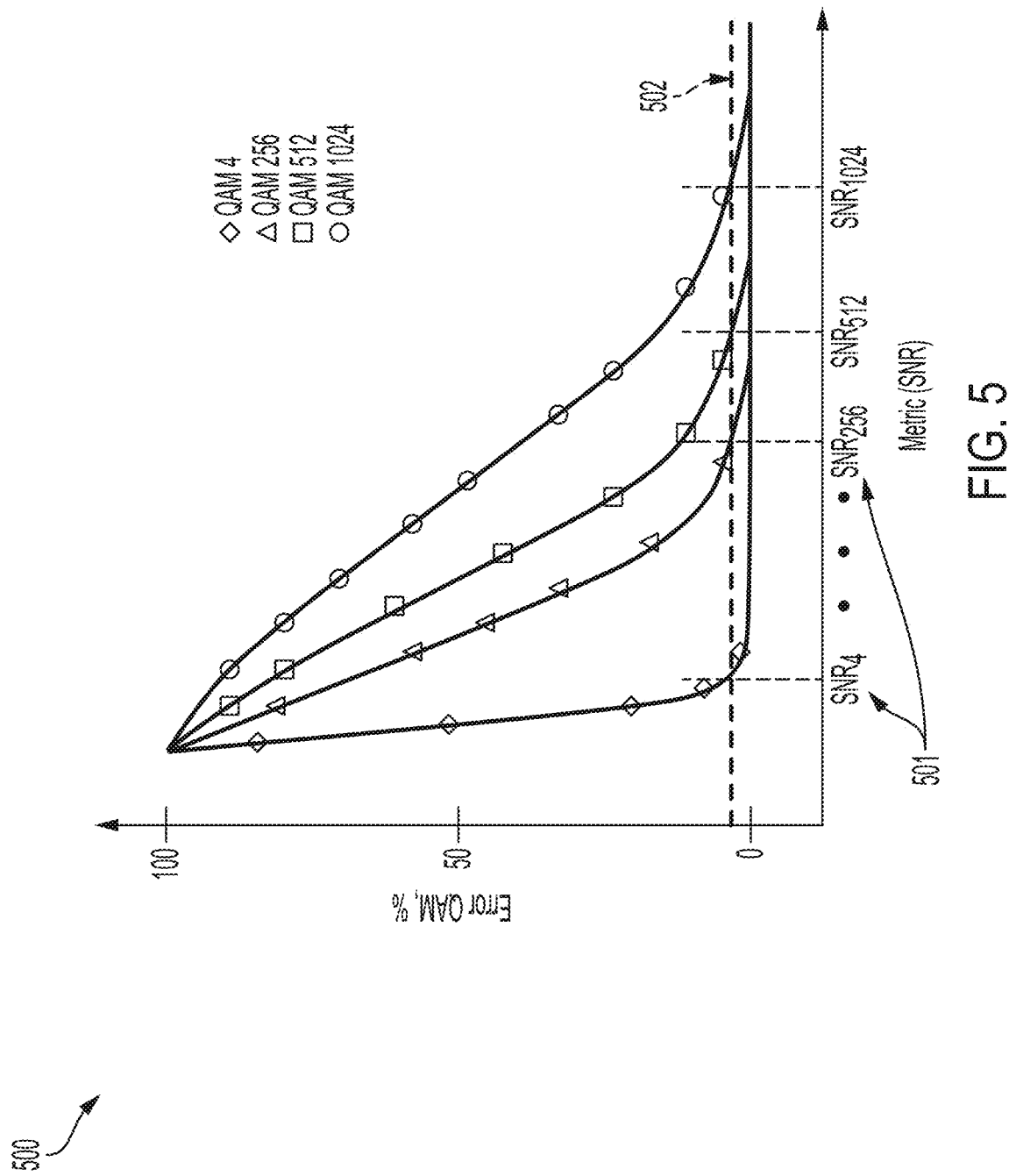
FIG. 5 is a graph for selecting metric thresholds for different modulation types, in accordance with some embodiments.

In some embodiments, a decision is made to change the modulation type in each subcarrier or a group of subcarriers based on a metric and threshold values for each modulation type (as shown in FIGS. 4-5) for one subcarrier or a group.

In some embodiments, the threshold values for each modulation type are set as static values or can be dynamically adjusted, according to the collected statistics on data recovery in an error-correcting decoder. In some embodiments, the error-correcting decoder includes decoder 108. In some embodiments, the decoder 108 includes a Reed-Solomon decoder or a LDPC.

In some embodiments, system 300A uses quadrature amplitude modulation (QAM), which can vary from QAM 4 to QAM 4096. In some embodiments, QAM 0 means that for a subcarrier or a group of subcarriers the signal is not transmitted due to a high level of noise interference.

In operation 330, map circuit 310 is configured to generate an output signal (T10) in response to signal T9.

In some embodiments, one or more of the operations of method 300B is not performed. By utilizing method 300B, one or more elements of system 100 or 300A is configured to achieve the benefits discussed herein.

FIG. 4 is a graph 400 for selecting the type of modulation using metrics and thresholds, in accordance with some embodiments.

In some embodiments, graph 400 is useable to generate one or more dynamic threshold values associated with each corresponding modulation type.

Graph 400 includes a metric 401. Metric 401 is a signal to noise ratio (SNR) of a received RF signal. Other parameter types for metric 401 are within the scope of the present disclosure.

In some embodiments, metric 401 is an embodiment of the metric of system 100, and similar detailed description is omitted. In some embodiments, metric 401 is at least one of signal T6a, T6b, T7 or T8 of system 300A or method 300B, and similar detailed description is omitted.

Graph 400 further includes threshold values 402 for each corresponding modulation type.

In some embodiments, system 300B is configured to correct one or more threshold values 402 for modulation type selection by collecting data recovery statistics (e.g., signal S11) from decoder 108, and calculating the channel capacity C for the current modulation type in each subcarrier or a group of subcarriers from the data recovery statistics.

The channel capacity C (Shannon's limit) is determined according to formula 2:

$$C = W * \log_2(1 + SNR) \quad (2)$$

Where W is the channel bandwidth, SNR is the signal to noise ratio, and C is the channel capacity.

A change in the signal-to-noise ratio ΔSNR is determined according to formula 3:

$$\Delta SNR = 2^{\Delta C/W} - 1 \quad (3)$$

Where ΔSNR is the change in the signal-to-noise ratio, ΔC is a change in the channel capacity, and W is the channel bandwidth.

From equation 2, a change in the SNR is expressed through a corresponding change in the channel capacity C. For example, if the channel capacity change for all subcarriers or groups of subcarriers with the same modulation type is combined (e.g., by combined metric circuit 307 in operation 327), then a threshold metric change SNR 402 is obtained depending on the channel capacity change for each modulation type.

From equation 3, if the error-correcting decoder (e.g., decoder 108) correctly recovers less data, then the threshold value 402 of the metric 401 for selecting this type of modulation is increased by +SNR, and vice versa. For example, if the error-correcting decoder (e.g., decoder 108) correctly recovers more data, then the threshold value 402 of the metric 401 for selecting this type of modulation is reduced by −SNR. Thus, the boundaries or threshold values 402 are dynamically adjusted to select the type of modulation, as shown in FIG. 4.

By utilizing graph 400, one or more elements of system 100 or 300A is configured to achieve the benefits discussed herein.

Other functions, configurations or number of elements in graph 400 are within the scope of the present disclosure.

FIG. 5 is a graph 500 for selecting metric thresholds for different modulation types, in accordance with some embodiments.

In some embodiments, graph 500 is useable to generate one or more static threshold values associated with each corresponding modulation type.

In some embodiments, FIG. 5 is a graph 500 with demapping errors of vectors of different modulation types (e.g., QAM4, QAM256, QAM512, QAM1024) versus the metric value, in accordance with some embodiments. Other metric values for other corresponding modulation types are within the scope of the present disclosure.

Graph 500 includes a set of metrics 501. Metric 501 is a signal to noise ratio (SNR) of a received RF signal. Other parameter types for metric 501 are within the scope of the present disclosure.

In some embodiments, metric 501 is an embodiment of the metric of system 100, and similar detailed description is omitted. In some embodiments, metric 501 is at least one of signal T6a, T6b, T7 or T8 of system 300A or method 300B, and similar detailed description is omitted.

Each value of the metric 501 corresponds to a different modulation type.

Graph 500 further includes a dashed line 502. In some embodiments, the dashed line 502 shows the recovery capability limit of the error-correcting decoder (e.g., decoder 108). In some embodiments, the value of the metric 501 at the point of intersection with line 502 corresponds to the static threshold value of the metric 501 for switching the modulation type.

In some embodiments, system 100 of FIG. 1 or system 300A of FIG. 3A is configured to determine the static threshold values for choosing metric 501. In some embodiments, system 100 of FIG. 1 or system 300A of FIG. 3A is configured to determine the static threshold values for choosing metric 501 by utilizing the statistics of errors in the demapping of vectors corresponding to the points of the signal constellation for different types of modulation (as shown in map 500). In some embodiments, Control RF 109 of FIG. 1 is configured to receive the statistics on data recovery in an error-correcting decoder (Reed-Solomon, LDPC) 108 for dynamically adjusted threshold values 402 for each modulation type. In some embodiments, decoder 108 has an error recovery capability limit that is calculated from the rate of operation of the corresponding error-correcting code.

By utilizing graph 500, one or more elements of system 100 or 300A is configured to achieve the benefits discussed herein.

Other functions, configurations or number of elements in graph 500 are within the scope of the present disclosure.

Figure 6:
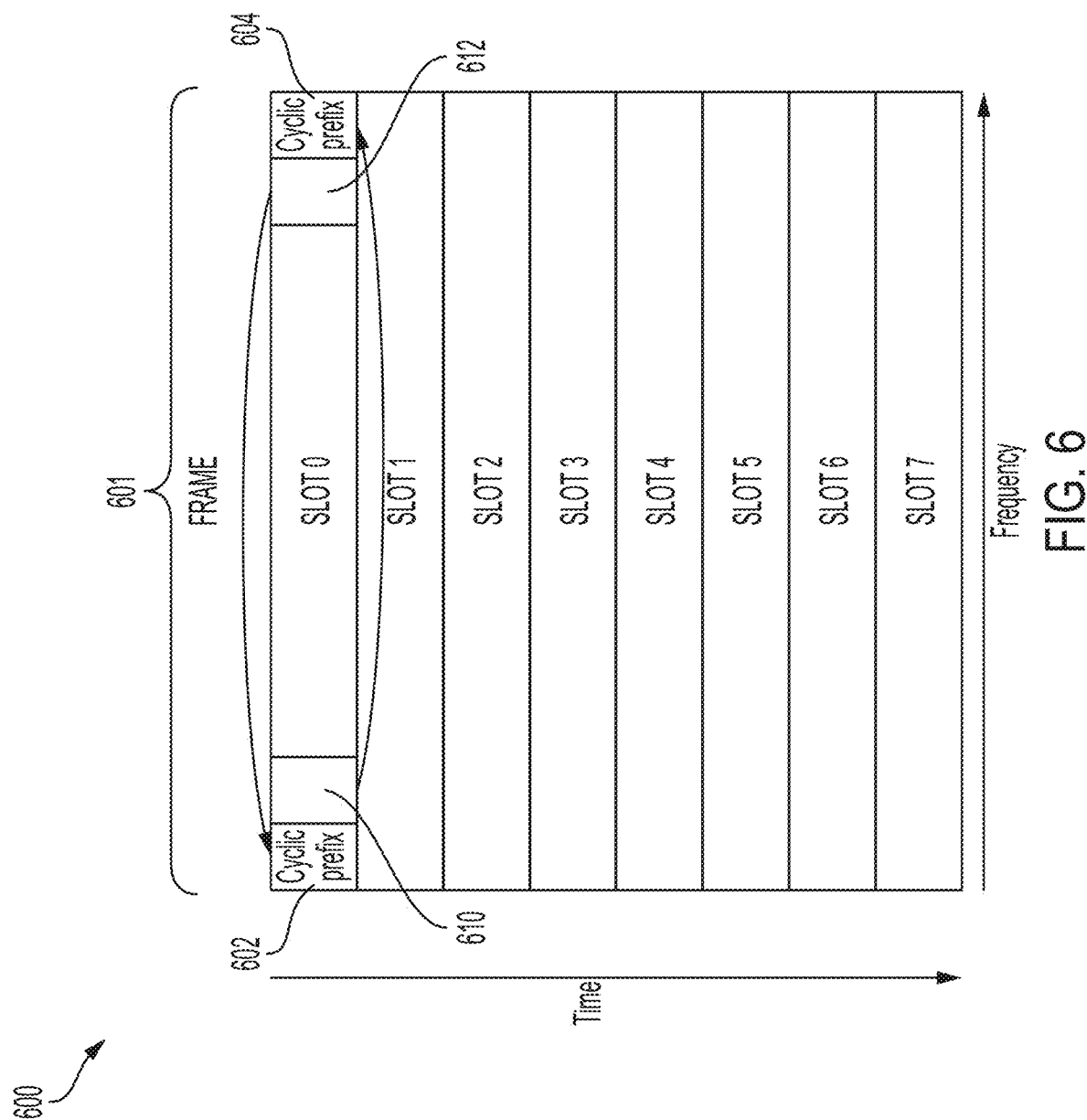
FIG. 6 is a diagram of a frame structure, in accordance with some embodiments.

FIG. 6 is a diagram of a frame structure 600, in accordance with some embodiments.

In some embodiments, the frame structure 600 is usable with system 100 of FIG. 1, system 300A of FIG. 3A or system 700 of FIG. 7, and similar detailed description is omitted.

In some embodiments, the frame structure 600 is usable with Doppler shift circuit 105 of FIG. 1, and similar detailed description is omitted. In some embodiments, the frame structure 600 is an embodiment of signal S5 of FIG. 1, and similar detailed description is omitted.

In some embodiments, the frame structure 600 includes slots 601. In some embodiments, each slot 601 includes 8 slots (e.g., SLOT 0, 1, . . . , 7). Other numbers of slots in one or more slot 601 for frame structure 600 are within the scope of the present disclosure.

Each slot 601 includes 256 signal samples. Other numbers of signal samples for one or more slots 601 in frame structure 600 are within the scope of the present disclosure.

Each slot 601 includes a cyclic prefix 602. The cyclic prefix 602 is positioned at the beginning of each slot 601. In some embodiments, the cyclic prefix 602 is a repetition of the last few samples (e.g., region 612) of each frame.

Each slot 601 further includes a cyclic postfix 604. The cyclic postfix 604 is positioned at the end of each slot 601. In some embodiments, the cyclic postfix 604 is a repetition of the first few samples (e.g., region 610) of each frame.

The range of values for regions 610 and 612 varies from 1 to 64 signal samples, depending on the degree of protection against inter-symbol interference. The more signal samples in regions 610 and 612, the greater the degree of protection against inter-symbol interference.

By utilizing frame structure 600, one or more elements of system 100 or 300A is configured to achieve the benefits discussed herein.

Other functions, configurations or number of elements in frame structure 600 are within the scope of the present disclosure.

Figure 7A:
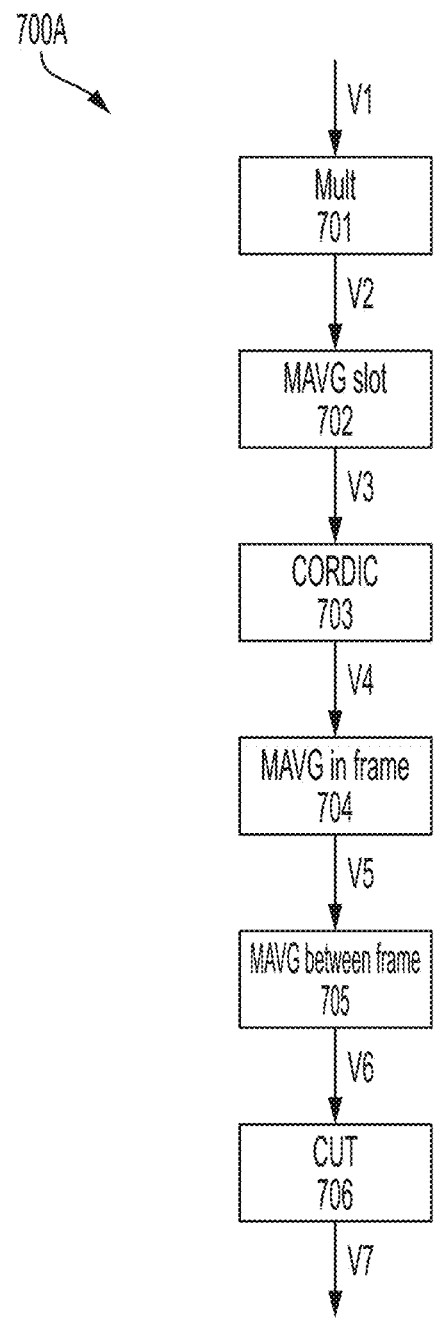
FIG. 7A is a block diagram of a system, in accordance with some embodiments.

FIG. 7A is a block diagram of a system 700A, in accordance with some embodiments.

Figure 7B:
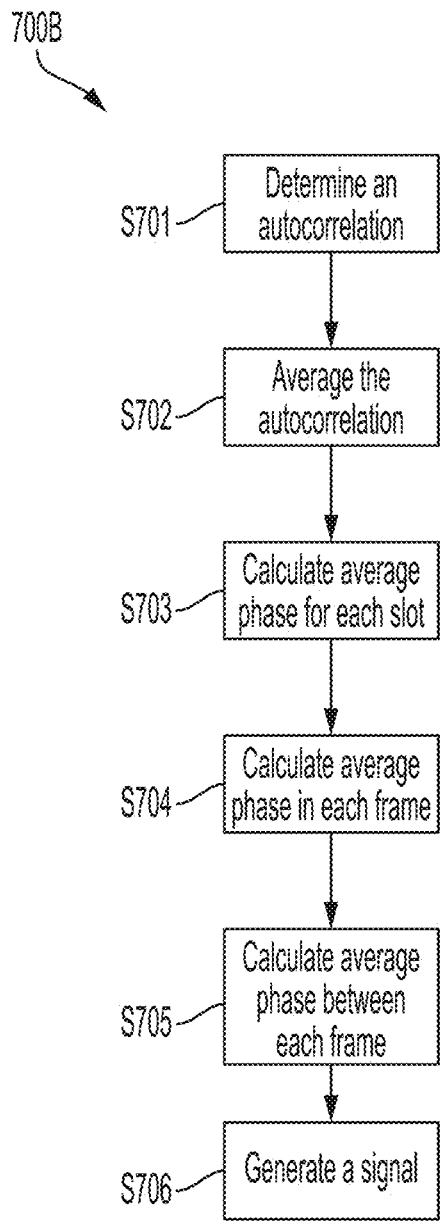
FIG. 7B is a method of operating the system of FIG. 7A, in accordance with some embodiments.

FIG. 7B is a method 700B of operating system 700A, in accordance with some embodiments.

In some embodiments, system 700A of FIG. 7A is an embodiment of the Doppler shift circuit 105, and similar detailed description is therefore omitted. In some embodiments, system 700 is useable to estimate the Doppler shift from the cyclic prefix and the cyclic postfix.

FIGS. 7A-7B show a series of steps or operations (e.g., S701, S702, S703, S704, S705 and S706), performed by system 700A, and are described in FIGS. 7A-7B as method 700B.

In some embodiments, at least portions of method 700B are performed by system 700A.

In some embodiments, FIG. 7B is a flowchart of a method 700B of operating system 100 of FIG. 1 or system 700A of FIG. 7A, and similar detailed description is therefore omitted. It is understood that additional operations may be performed before, during, and/or after the method 700B depicted in FIG. 7B, and that some other operations may only be briefly described herein. In some embodiments, other order of operations of method 700B is within the scope of the present disclosure. In some embodiments, one or more operations of method 700B are not performed.

Method 700B includes exemplary operations, but the operations are not necessarily performed in the order shown. Operations may be added, replaced, changed order, and/or eliminated as appropriate, in accordance with the spirit and scope of disclosed embodiments. It is understood that method 700B utilizes features of one or more of system 100 or system 700A.

System 700A includes a Mult circuit 701 coupled to a MAVG slot circuit 702. System 700A further includes the MAVG slot circuit 702 coupled to a CORDIC circuit 703. System 700A further includes the CORDIC circuit 703 coupled to a MAVG in FRAME circuit 704. System 700A further includes the MAVG in FRAME circuit 704 coupled to a MAVG between FRAME circuit 705. System 700A further includes the MAVG between FRAME circuit 705 coupled to a CUT circuit 706.

In operation S701 of method 700B, an autocorrelation of the cyclic prefix and the cyclic postfix of each slot 601 is determined by the Mult circuit 701.

In some embodiments, the cyclic prefix and the cyclic postfix of each slot 601 is signal V1. In some embodiments, the autocorrelation of the cyclic prefix and the cyclic postfix of each slot 601 is signal V2. In some embodiments, the Mult circuit 701 generates signal V2 in response to signal V1.

In operation S702 of method 700B, the autocorrelation for each slot 601 is averaged by the MAVG slot circuit 702.

In some embodiments, the average of the autocorrelation value for each slot 601 is signal V3. In some embodiments, the MAVG slot circuit 702 generates signal V3 in response to signal V2.

In operation S703 of method 700B, the average phase for each slot is calculated by the CORDIC circuit 703.

In some embodiments, the average phase for each slot 601 is signal V4. In some embodiments, the CORDIC circuit 703 generates signal V4 in response to signal V3.

In operation S704 of method 700B, the average of the phase in each frame is determined by the MAVG in FRAME circuit 704.

In some embodiments, the average of the phase in each frame is signal V5. In some embodiments, the MAVG in FRAME circuit 704 generates signal V5 in response to signal V4.

In operation S705 of method 700B, the average of the phase between each frame is determined by the MAVG between FRAME circuit 705.

In some embodiments, the average of the phase between each frame is signal V6. In some embodiments, the MAVG between FRAME circuit 705 generates signal V6 in response to signal V5.

In operation S706 of method 700B, invalid initial values are excluded in generating a signal V7 by the CUT circuit 706.

In some embodiments, signal V7 is the resulting valid phase incursion values for each frame. In some embodiments, the resulting valid phase incursion values for each frame are a rough estimate of the Doppler shift value from the cyclic prefix and cyclic postfix. In some embodiments, the CUT circuit 706 generates signal V7 in response to signal V6.

In some embodiments, pilot data is used to accurately estimate the value of the Doppler shift. In some embodiments, the sequence of pilot data is evenly distributed in time and frequency is located in four consecutive frames. In some embodiments, collecting pilot data for four consecutive frames, then data is accumulated from all 256 subcarriers, and system 700A is configured to restore the complex frequency response of the channels.

In some embodiments, system 700A uses complex pilot data values obtained from an M-sequence compared to other approaches that use static pilot data. In some embodiments, the M-sequence includes a sequence of 1 and −1, and therefore has zero mathematical expectation. In some embodiments, by having zero mathematical expectation, the pilot data does not change the energy of the signal, and the signal spectrum does not include a constant component.

By utilizing at least one of system 700A or method 700B, one or more elements of system 100 or 300A is configured to achieve the benefits discussed herein.

Other functions, operations, configurations or number of elements in at least one of system 700A or method 700B are within the scope of the present disclosure.

Figure 8A:
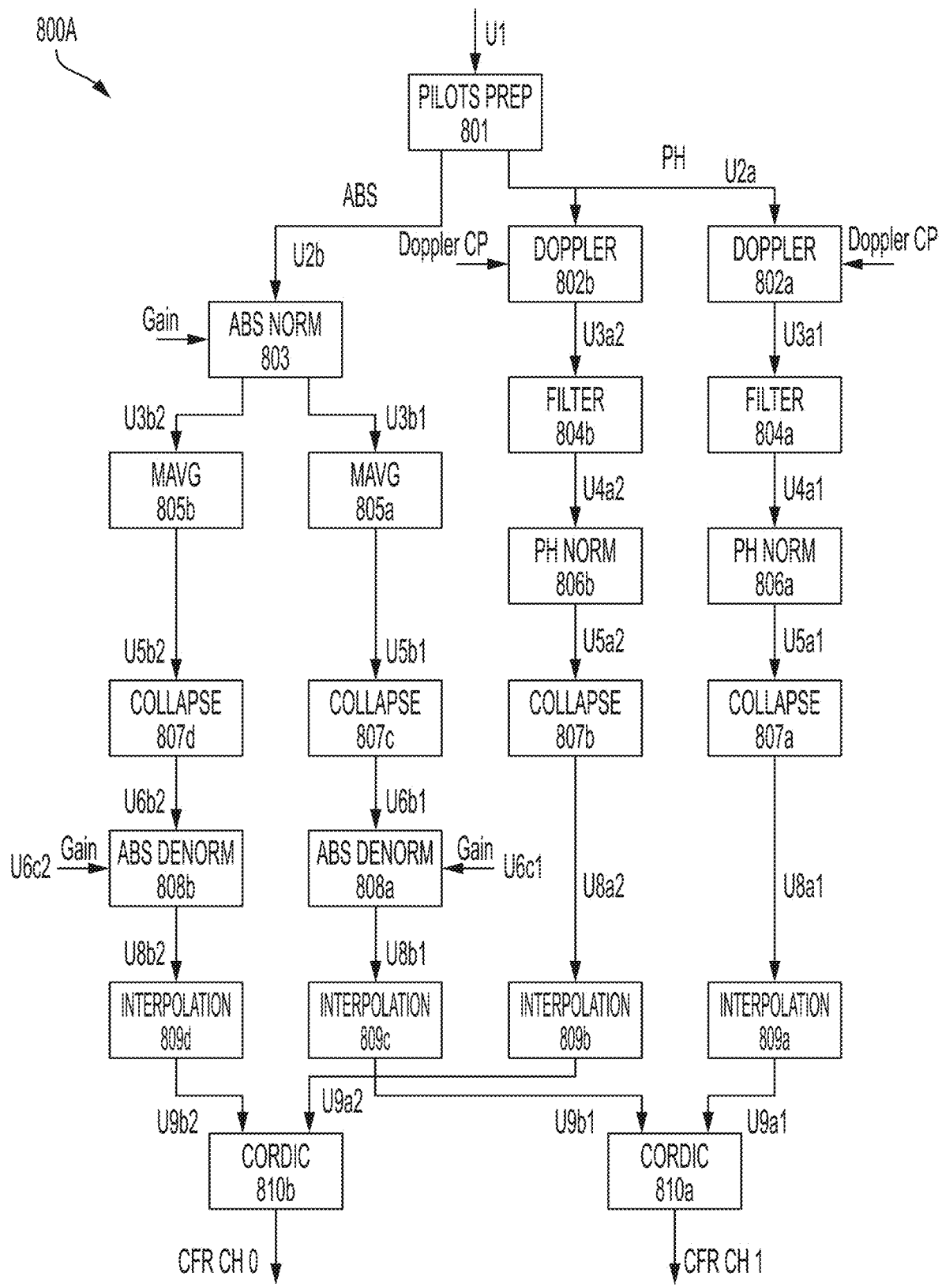
FIG. 8A is a block diagram of a system, in accordance with some embodiments.

FIG. 8A is a block diagram of a system 800A, in accordance with some embodiments.

Figure 8B:
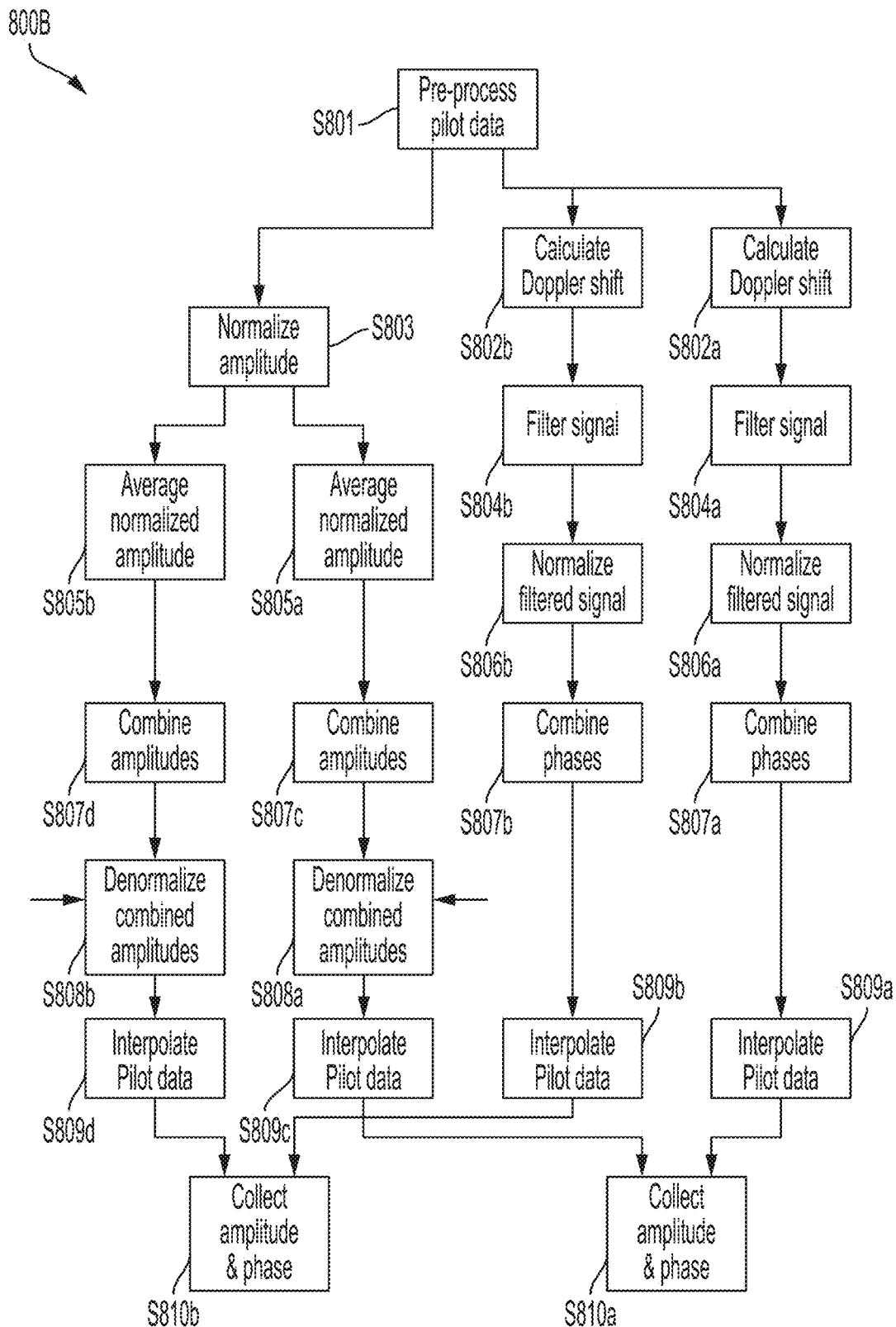
FIG. 8B is a method of operating the system of FIG. 8A, in accordance with some embodiments.

FIG. 8B is a method 800B of operating system 800A, in accordance with some embodiments.

In some embodiments, system 800A of FIG. 8A is an embodiment of CM 107 of FIG. 1, and similar detailed description is therefore omitted. In some embodiments, system 800 is useable to estimate the Doppler shift from the cyclic prefix and the cyclic postfix.

FIGS. 8A-8B show a series of steps or operations (e.g., S801, S802a, S802b, S803, S804a, S804b, S805a, S805b, S806a, S806b, S807a, S807b, S807c, S807d, S808a, S808b, S809a, S809b, S809c, S809d, S810a and S810b), performed by system 800A, and are described in FIGS. 8A-8B as method 800B.

In some embodiments, at least portions of method 800B are performed by system 800A.

In some embodiments, FIG. 8B is a flowchart of a method 800B of operating system 100 of FIG. 1 or system 800A of FIG. 8A, and similar detailed description is therefore omitted. It is understood that additional operations may be performed before, during, and/or after the method 800B depicted in FIG. 8B, and that some other operations may only be briefly described herein. In some embodiments, other order of operations of method 800B is within the scope of the present disclosure. In some embodiments, one or more operations of method 800B are not performed.

Method 800B includes exemplary operations, but the operations are not necessarily performed in the order shown. Operations may be added, replaced, changed order, and/or eliminated as appropriate, in accordance with the spirit and scope of disclosed embodiments. It is understood that method 800B utilizes features of one or more of system 100 or system 800A.

System 800A includes a Pilots prep circuit 801 coupled to a Doppler circuit 802a, a Doppler circuit 802b and an ABS Norm circuit 803. System 800A further includes Doppler circuit 802a and 802b coupled to a corresponding Filter 804a and 804b. System 800A further includes the Filter 804 and 804b coupled to a corresponding PH Norm circuit 806a and 806b. System 800A further includes the PH Norm circuit 806a and 806b coupled to a corresponding Collapse circuit 807a and 807b. System 800A further includes the Collapse circuit 807a and 807b coupled to a corresponding Interpolation circuit 809a and 809b. System 800A further includes the Interpolation circuit 809a and 809b coupled to a corresponding CORDIC circuit 810a and 810b.

System 800A further includes the ABS Norm circuit 803 coupled to a MAVG circuit 805a and 805b. System 800A further includes the MAVG circuit 805a and 805b coupled to a corresponding Collapse circuit 807c and 807d. System 800A further includes the Collapse circuit 807c and 807d coupled to a corresponding ABS Denorm circuit 808a and 808b. System 800A further includes the ABS Denorm circuit 808a and 808b coupled to a corresponding Interpolation circuit 809c and 809d. System 800A further includes the Interpolation circuit 809c and 809d coupled to the corresponding CORDIC circuit 810a and 810b.

In operation S801 of method 800B, the pilot data is pre-processed, and the amplitude and phase for each channel is calculated by the Pilots prep circuit 801.

In some embodiments, the pilot data is signal U1. In some embodiments, the amplitude and phase for each channel is signal U2a and signal U2b. In some embodiments, the Pilots prep circuit 801 generates signals U2a and U2b in response to signal U1.

In some embodiments, in the CM 107 of subsequent receivers, the processing of pilot data occurs in time and independently of each other.

In operation S803 of method 800B, the amplitude is normalized to the gain values GAIN received from the AGC circuit 103 (e.g., signal S4) by the ABS Norm circuit 803.

In some embodiments, the normalized amplitude for each channel is signal U3b1 and signal U3b2. In some embodiments, the ABS Norm circuit 803 generates signal U3b1 and signal U3b2 in response to signal U2b.

In operation S805a and S805b of method 800B, the normalized amplitude values are averaged by the MAVG circuit 805a and 805b.

In some embodiments, after the amplitude is averaged, extrapolation is used to predict the subsequent amplitude.

In some embodiments, the normalized amplitude values for each channel are signal U5b1 and signal U5b2. In some embodiments, the MAVG circuit 805a and 805b generates corresponding signal U5b1 and signal U5b2 in response to corresponding signal U3b1 and U3b2.

In operation S802a and S802b of method 800B, the Doppler shift is calculated by the Doppler circuit 802a and the Doppler circuit 802b.

In some embodiments, the Doppler shift for each channel is signal U3a1 and signal U3a2. In some embodiments, the Doppler circuit 802a generates signal U3a1 in response to signal U2a and Doppler CP. In some embodiments, the Doppler circuit 802b generates signal U3a2 in response to signal U2a and Doppler CP. In some embodiments, the Doppler CP is an embodiment of signal S6, and similar detailed description is therefore omitted.

In some embodiments, in the CM 107 of the present receiver, an approximate Doppler correction is applied to the current phase value, by incrementing the rough Doppler shift value to the current phase value. In some embodiments, the correction caused by the synchronization shift in the primary synchronization sequence (PSS) is also applied to the current phase value in parallel with the applied approximate Doppler correction. In some embodiments, a difference between these phases is then calculated, and results in a delta D. In some embodiments, the delta is the error in the approximate measurement of the Doppler shift. In some embodiments, adding the value of the approximate Doppler measurement over the cyclic prefix CP to the delta D results in a precise value of the Doppler shift in each slot of slots 601. In some embodiments, in the CM 107 of subsequent receivers, the absolute value of the Doppler shift is applied.

In operation S804a and S804b of method 800B, the signal is filtered 804 by a filter 804a and 804b. In some embodiments, at least one of filter 804a or 804b is a low-pass filter.

In some embodiments, the filtered signal is a filtered phase signal. In some embodiments, the filtered phase for each channel is signal U4a1 and signal U4a2. In some embodiments, the Filter 804a and 804b generates corresponding signal U4a1 and signal U4a2 in response to corresponding signal U3a1 and signal U3a2.

In operation S806a and S806b of method 800B, the filtered signal is normalized by a PH Norm circuit 806a and 806b.

In some embodiments, the normalized filtered signal for each channel is signal U5a1 and signal U5a2. In some embodiments, the PH Norm circuit 806a and 806b generates corresponding signal U5a1 and signal U5a2 in response to corresponding signal U3a1 and signal U3a2.

In some embodiments, phase filtering by Filter 804a and 804b uses extrapolation to predict the subsequent phase. In some embodiments, the phase is smooth in the time domain. In some embodiments, a difference between the actual phase value and the predicted phase is the phase noise. In some embodiments, the phase difference is filtered by a low-pass filter (e.g., Filter 804a and 804b) to discard high-frequency noise. In some embodiments, the actual value of the phase deviation from that predicted by extrapolation is obtained.

In some embodiments, the phase deviation is summed with the extrapolated value by the PH Norm circuit 806a and 806b, and the absolute value of the phase is obtained.

In operation S807a and S807b of method 800B, the phases are independently combined channel by channel of the subcarriers by the corresponding Collapse circuit 807a and 807b.

In operation S807c and S807d of method 800B, the amplitudes are independently combined channel by channel of the subcarriers by the corresponding Collapse circuit 807c and 807d.

In some embodiments, the combined phases for each channel are signal U8a1 and signal U8a2. In some embodiments, the Collapse circuit 807a and 807b generates corresponding signal U8a1 and signal U8a2 in response to corresponding signal U5a1 and signal U5a2.

In some embodiments, the combined amplitudes for each channel are signal U6b1 and signal U6b2. In some embodiments, the Collapse circuit 807a and 807b generates corresponding signal U6b1 and signal U6b2 in response to corresponding signal U5b1 and signal U5b2.

In some embodiments, the values of the pilot data from the time domain to the frequency domain are collected. In some embodiments, the absolute value of the Doppler shift is applied to each subcarrier by Collapse circuit 807a and 807*b*, since, depending on the distance from the central subcarrier, a different Doppler shift occurs.

In operation S808*a* and S808*b* of method 800B, the combined amplitude values are denormalized by ABS Denorm circuit 808*a* and 808*b*. In some embodiments, the amplitude values are denormalized by using the gain values GAIN that are used in operation 803 (e.g., signal S4).

In some embodiments, the denormalized combined amplitudes for each channel are signal U8*b*1 and signal U8*b*2. In some embodiments, the ABS Denorm circuit 808*a* and 808*b* generates corresponding signal U8*b*1 and signal U8*b*2 in response to corresponding signal U6*b*1 and signal U6*b*2.

In operation S809*a* and S809*b* of method 800B, the collected pilot data samples are interpolated per channel in the time domain to obtain intermediate phase values by Interpolation circuit 809*a* and 809*b*.

In operation S809*c* and S809*d* of method 800B, the collected pilot data samples are interpolated per channel in the time domain to obtain intermediate amplitude values by Interpolation circuit 809*c* and 809*d*.

In some embodiments, the intermediate phase values for each channel are signal U9*a*1 and signal U9*a*2. In some embodiments, the Interpolation circuit 809*a* and 809*b* generates corresponding signal U9*a*1 and signal U9*a*2 in response to corresponding signal U8*a*1 and signal U8*a*2.

In some embodiments, the intermediate amplitude values for each channel are signal U9*b*1 and signal U9*b*2. In some embodiments, the Interpolation circuit 809*c* and 809*d* generates corresponding signal U9*b*1 and signal U9*b*2 in response to corresponding signal U8*b*1 and signal U8*b*2.

In operation S810*a* and S810*b* of method 800B, the amplitude and phase values in the frequency domain are collected per channel to reconstruct the complex frequency response (CFR) of the channels. The result is a complex frequency response for each channel with finely adjusted Doppler shift.

In some embodiments, the CFR for each channel are signal CFR CH1 and signal CFR CH0. In some embodiments, the CORDIC circuit 810*a* generates signal CFR CH1 in response to corresponding signal U9*a*1 and signal U9*b*1. In some embodiments, the CORDIC circuit 810*b* generates signal CFR CH0 in response to corresponding signal U9*a*2 and signal U9*b*2.

By utilizing at least one of system 800A or method 800B, one or more elements of system 100 or 300A is configured to achieve the benefits discussed herein.

Other functions, operations, configurations or number of elements in at least one of system 800A or method 800B are within the scope of the present disclosure.

FIG. 9 is a block diagram of a system 900, in accordance with some embodiments.

In some embodiments, system 900 is an embodiment of one or more elements in system 200, 300A, 700A or 800A, and similar detailed description is therefore omitted. In some embodiments, system 900 is an embodiment of one or more elements in receiver 100, and similar detailed description is therefore omitted.

In some embodiments, system 900 is configured to perform one or more operations of methods 300B, 700B or 800B.

In some embodiments, system 900 is usable in place of one or more elements of system 200, 300A, 700A or 800A. In some embodiments, system 900 is usable in place of one or more elements of receiver 100.

System 900 includes a hardware processor 902 and a non-transitory, computer readable storage medium 904 encoded with, i.e., storing, the computer program code 906, i.e., a set of executable instructions. Computer readable storage medium 904 is configured for interfacing with at least one element of system 200, 300A, 700A or 800A or receiver 100, and similar detailed description is therefore omitted.

The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in at least method 300B, 700B or 800B. In some embodiments, network 914 is not part of system 900.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

In some embodiments, the storage medium 904 stores the computer program code 906 configured to cause system 900 to perform at least method 300B, 700B or 800B. In some embodiments, the storage medium 904 also stores information needed for performing method 900 as well as information generated during performing at least method 300B, 700B or 800B such as signals 916, a map 918, a user interface 924 or user parameters 926, and/or a set of executable instructions to perform the operation of at least method 300B, 700B or 800B.

In some embodiments, the storage medium 904 stores instructions (e.g., computer program code 906) for interfacing with at least one or more elements of system 200, 300A, 700A or 800A or receiver 100. The instructions (e.g., computer program code 906) enable processor 902 to generate instructions readable by at least one or more of element of system 200, 300A, 700A or 800A or receiver 100 to effectively implement one or more operations of at least methods 300B, 700B or 800B during operation of system 200, 300A, 700A or 800A or receiver 100.

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as OFDMA, CDMA, BLUETOOTH, WIFI, WIMAX, GPRS, WCDMA or IEEE-802.11 or wired network interface such as ETHERNET, USB, or IEEE-1394. In some embodiments, at least one or more of method 300B, 700B or 800B is implemented in two or more Systems 900, and information such as memory type, memory array layout, I/O voltage, I/O pin location and charge pump are exchanged between different Systems 900 via network 914.

System 900 is configured to receive information related to signals through I/O interface 910 or network interface 912. The information is transferred to processor 902 by bus 908, and is then stored in computer readable medium 904 as signals 916. In some embodiments, signals 916 corresponds to at least or more of signals S1-S11, T1$a$1-T10, V1-V7, U1-U9$b$2, CFR CH0, CFR CH1, Gain, Doppler CP, and similar detailed description is therefore omitted.

System 900 is configured to receive information related to the map through I/O interface 910 or network interface 912. The information is stored in computer readable medium 904 as map 918. In some embodiments, map 918 corresponds to at least or more of the updated modulation map (e.g., signal S9, T10), one or more of graph 400 or 500 or one or more parameters or signals of FIGS. 1-8B, and similar detailed description is therefore omitted.

System 900 is configured to receive information related to a user interface through I/O interface 910 or network interface 912. The information is stored in computer readable medium 904 as user interface 924.

System 900 is configured to receive information related to the user parameters through I/O interface 910 or network interface 912. The information is stored in computer readable medium 904 as user parameters 926. In some embodiments, user parameters 926 corresponds to at least one or more of signals S1-S11, T1$a$1-T10, V1-V7, U1-U9$b$2, CFR CH0, CFR CH1, Gain, Doppler CP, the metric 401, the set of metrics 501, frame 601, thresholds of FIGS. 1-8B, or one or more of the parameters in FIGS. 1-8B, or methods 300B, 700B or 800B, and similar detailed description is therefore omitted.

In some embodiments, at least methods 300B, 700B or 800B is implemented as a standalone software application for execution by a processor. In some embodiments, at least methods 300B, 700B or 800B is implemented as corresponding software applications for execution by one or more processors.

In some embodiments, at least method methods 300B, 700B or 800B is implemented as a software application that is a part of an additional software application. In some embodiments, at least method methods 300B, 700B or 800B is implemented as a plug-in to a software application.

In some embodiments, at least method methods 300B, 700B or 800B is implemented as a software application that is a portion of a customer care tool. In some embodiments, the customer care tool is used to plan, deploy, monitor and optimize customer care of one or more cellular networks.

In some embodiments, one or more of the operations of methods 300B, 700B or 800B is not performed.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

An aspect of this description relates to a method for selecting a modulation type for a group of subcarriers in a radio frequency (RF) receiver with orthogonal frequency division multiplexing (OFDM). In some embodiments, the method includes receiving an RF transmitted signal, wherein the RF transmitted signal includes a set of subcarriers. In some embodiments, the method further includes obtaining a series of digital samples from the RF transmitted signal, converting the series of digital signals into a corresponding set of frequency domain signals, obtaining a complex frequency response of a set of transmission channels based on the corresponding set of frequency domain signals. In some embodiments, the obtaining the complex frequency response of the set of transmission channels includes interpolating pilot data and correcting a corresponding phase of the pilot data according to a calculated Doppler shift. In some embodiments, the method further includes calculating a signal to noise ratio (SNR) metric from an amplitude frequency response of the complex frequency response in the set of subcarriers. In some embodiments, the method further includes calculating dynamic threshold values of the SNR metric from collected statistics of data recovery in a decoder, wherein each dynamic threshold value of the dynamic threshold values is associated with a corresponding modulation type, and is useable for switching the modulation type. In some embodiments, the method further includes switching the modulation type in the set of subcarriers based on the SNR metric and the dynamic threshold values. In some embodiments, the method further includes transmitting an updated modulation map to a transmitter.

Another aspect of this description relates a method for selecting a modulation type for a group of subcarriers in a radio frequency (RF) receiver with orthogonal frequency division multiplexing (OFDM). In some embodiments, the method includes receiving an RF transmitted signal, wherein the RF transmitted signal includes a set of subcarriers. In some embodiments, the method further includes obtaining a series of digital samples from the RF transmitted signal. In some embodiments, the method further includes converting the series of digital signals into a corresponding set of frequency domain signals. In some embodiments, the method further includes obtaining a complex frequency response of a set of transmission channels based on the corresponding set of frequency domain signals. In some embodiments, the obtaining the complex frequency response of the set of transmission channels includes interpolating pilot data and correcting a corresponding phase of the pilot data according to a calculated Doppler shift. In some embodiments, the method further includes calculating a signal to noise ratio (SNR) metric from an amplitude frequency response of the complex frequency response in the set of subcarriers. In some embodiments, the method further includes calculating static threshold values of the SNR metric for selecting the modulation type, wherein each static threshold value of the static threshold values is associated with a corresponding modulation type, and is useable for switching the modulation type. In some embodiments, the calculating static threshold values of the SNR metric for selecting the modulation type includes collecting error statistics in the demapping of vectors corresponding to signal constellation points for different modulation types, and finding signal points of the signal constellation points corresponding to a recovery capability limit for each different modulation type of a decoder. In some embodiments, the method further includes switching the modulation type in the set of subcarriers based on the SNR metric and the static threshold values. In some embodiments, the method further includes transmitting an updated modulation map to a transmitter.

Yet another aspect of this description relates to a method for estimating a complex frequency response of channels in a radio frequency (RF) receiver with orthogonal frequency division multiplexing (OFDM) includes obtaining complex pilot data in a frame from a sequence signal, determining a first estimate of a Doppler shift from a cyclic prefix of the frame, and a cyclic postfix of the frame or from the complex pilot data, performing time-domain processing of an amplitude of the complex pilot data and a phase of the complex pilot data separately for each subcarrier, determining a time average of the amplitude of the complex pilot data, and calculating a Doppler shift of each slot of the frame from a corrected phase by correcting the phase of the complex pilot data by the first estimate of the Doppler shift thereby generating the corrected phase, and filtering the corrected phase by a first filter in generating a filtered phase. The filtering the corrected phase by the first filter includes averaging the phase over time by a moving average filter; or extrapolating the corrected phase. The filtering the corrected phase by the first filter is performed in the time domain.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for selecting a modulation type for a group of subcarriers in a radio frequency (RF) receiver with orthogonal frequency division multiplexing (OFDM), the method comprising:
   receiving an RF transmitted signal, wherein the RF transmitted signal includes a set of subcarriers;
   obtaining a series of digital samples from the RF transmitted signal;
   converting the series of digital samples into a corresponding set of frequency domain signals;
   obtaining a complex frequency response of a set of transmission channels based on pilot data contained in the of frequency domain signals, the obtaining the complex frequency response of the set of transmission channels comprises:
   interpolating the pilot data and correcting a corresponding phase of the pilot data according to a calculated Doppler shift;
   calculating a signal to noise ratio (SNR) metric from an amplitude frequency response of the complex frequency response in the set of subcarriers;
   calculating dynamic threshold values of the SNR metric from collected statistics of data recovery in a decoder, wherein each dynamic threshold value of the dynamic threshold values is associated with a corresponding modulation type, and is useable for switching the modulation type;
   switching the modulation type in the set of subcarriers based on the SNR metric and the dynamic threshold values; and
   transmitting an updated modulation map to a transmitter.

2. The method of claim 1, wherein
   the set of subcarriers are divided into the group of subcarriers, and
   the method further comprises:
   calculating an average SNR for the group of subcarriers; and
   switching the modulation type for each subcarrier in the group of subcarriers.

3. The method of claim 1, wherein the set of subcarriers are divided into the group of subcarriers, and data fails to be transmitted in the group of subcarriers in response to a level of noise in the group of subcarriers being higher than a limit value.

4. The method of claim 1, wherein before switching the modulation type in the set of subcarriers, the method further comprises:
   filtering the SNR metric by a high-pass filter, wherein the high-pass filter is configured to respond to a change in the modulation type to another modulation type that is more noise-resistant than the modulation type in a first time; and
   filtering the SNR metric by a low-pass filter, wherein the low-pass filter is configured to respond to the change in the modulation type to the another modulation type with a greater channel capacity modulation type in a second time greater than the first time.

5. The method of claim 1, wherein the modulation type comprises:
   phase-shift keying (PSK); or
   quadrature amplitude modulation (QAM).

6. The method of claim 1, further comprising:
   calculating an average value of the amplitude frequency response; and
   calculating a dispersion of the amplitude frequency response,
   wherein recurrent forms without accumulation is used in calculating the average value of the amplitude frequency response, and calculating the dispersion of the amplitude frequency response.

7. The method of claim 1, wherein
   the method is applied to another RF receiver, and another transmitter,
   the another transmitter has another updated modulation map and another SNR metric; and
   the method further comprises:
   failing to combine the SNR metric and the another SNR metric in response to the another transmitter having the another updated modulation map and the transmitter having the updated modulation map.

8. The method of claim 1, wherein the decoder is a noise-resisting decoder configured to collect data recovery statistics, and is configured with at least one or more of Reed-Solomon codes, low-density parity-check (LDPC) codes or turbo codes.

9. A method for estimating a complex frequency response of channels in a radio frequency (RF) receiver with orthogonal frequency division multiplexing (OFDM), the method comprising:
  obtaining complex pilot data derived from an M-sequence, the M-sequence being distributed inside a frame;
  determining a first estimate of a Doppler shift from a cyclic prefix of the frame, and a cyclic postfix of the frame;
  performing time-domain processing of an amplitude of the complex pilot data and a phase of the complex pilot data separately for each subcarrier;
  determining a time average of the amplitude of the complex pilot data; and
  calculating a Doppler shift of each slot of the frame from a corrected phase by correcting the phase of the complex pilot data by the first estimate of the Doppler shift thereby generating the corrected phase, and filtering the corrected phase by a first filter in generating a filtered phase, wherein the filtering the corrected phase by the first filter comprises:
    averaging the phase over time by a moving average filter; or
    extrapolating the corrected phase;
  wherein the filtering the corrected phase by the first filter is performed in the time domain.

10. The method of claim 9, wherein
  the complex pilot data is selected by a static value;
  an accumulation of pilot signals from all subcarriers in a number of frames, the number of frames being different from a number of the all subcarriers;
or
  a sequence signal comprises:
    the M-sequence;
    a Gold sequence; or
    a Kasami sequence.

11. The method of claim 9, wherein
  calculating the Doppler shift of each slot of the frame comprises calculating the Doppler shift of each slot of the frame based on the cyclic prefix and the cyclic postfix;
  calculating the Doppler shift of each slot of the frame comprises calculating the Doppler shift of each slot of the frame based on the complex pilot data; or
  the method further comprises:
    determining the first estimate of the Doppler shift based on a synchronization shift in a primary synchronization sequence (PSS).

12. The method of claim 9, wherein
performing time-domain processing of the amplitude of the complex pilot data comprises:
  performing time-domain processing of the amplitude of the complex pilot data without normalization and denormalization to a gain value of the RF receiver; or
  performing time-domain processing of the amplitude of the complex pilot data by a low-pass filter, and not by a moving average; or
  performing time-domain processing of the amplitude of the complex pilot data comprises:
    performing time-domain processing of the amplitude of the complex pilot data by extrapolation.

13. The method of claim 9, wherein calculating the Doppler shift of each slot of the frame comprises:
  calculating the Doppler shift of each slot of the frame without accounting for a synchronization shift in a primary synchronization sequence (PSS).

14. The method of claim 9, wherein the filtering the corrected phase by the first filter comprises:
  averaging the phase over time by a moving average.

15. A method for selecting a modulation type for a group of subcarriers in a radio frequency (RF) receiver with orthogonal frequency division multiplexing (OFDM), the method comprising:
  receiving an RF transmitted signal, wherein the RF transmitted signal includes a set of subcarriers;
  obtaining a series of digital samples from the RF transmitted signal;
  converting the series of digital samples into a corresponding set of frequency domain signals;
  obtaining a complex frequency response of a set of transmission channels based on pilot data contained in the set of frequency domain signals, the obtaining the complex frequency response of the set of transmission channels comprises:
    interpolating the pilot data and correcting a corresponding phase of the pilot data according to a calculated Doppler shift;
  calculating a signal to noise ratio (SNR) metric from an amplitude frequency response of the complex frequency response in the set of subcarriers;
  calculating static threshold values of the SNR metric for selecting the modulation type, wherein each static threshold value of the static threshold values is associated with a corresponding modulation type, and is useable for switching the modulation type, the calculating static threshold values of the SNR metric for selecting the modulation type comprises:
    collecting error statistics in demapping of vectors corresponding to signal constellation points for different modulation types;
    finding boundaries corresponding to a recovery capability limit for each different modulation type of a decoder;
  switching the modulation type in the set of subcarriers based on the SNR metric and the static threshold values; and
  transmitting an updated modulation map to a transmitter.

16. The method of claim 15, wherein the calculating static threshold values of the SNR metric for selecting the modulation type comprises:
  selecting static thresholds for selection of the SNR metric, wherein
the selecting the static thresholds occurs at the signal constellation points where errors of the demapping vectors of different modulation types fail to appear.

* * * * *